US011419457B2

(12) United States Patent
Joel

(10) Patent No.: US 11,419,457 B2
(45) Date of Patent: Aug. 23, 2022

(54) HERB GRINDER AND ASSOCIATED METHOD

(71) Applicant: Austin Louis Joel, Atlanta, GA (US)

(72) Inventor: Austin Louis Joel, Atlanta, GA (US)

( * ) Notice: Subject to any disclaimer, the term of this patent is extended or adjusted under 35 U.S.C. 154(b) by 0 days.

(21) Appl. No.: 17/565,401

(22) Filed: Dec. 29, 2021

(65) Prior Publication Data

US 2022/0218152 A1 Jul. 14, 2022

Related U.S. Application Data

(60) Provisional application No. 63/136,491, filed on Jan. 12, 2021.

(51) Int. Cl.

| | |
|---|---|
| *A47J 42/20* | (2006.01) |
| *A47J 42/40* | (2006.01) |
| *A24B 7/14* | (2006.01) |
| *A47J 42/14* | (2006.01) |
| *A24B 7/06* | (2006.01) |
| *A47J 42/50* | (2006.01) |
| *A47J 42/12* | (2006.01) |
| *A47J 42/38* | (2006.01) |

(52) U.S. Cl.
CPC .............. *A47J 42/20* (2013.01); *A24B 7/06* (2013.01); *A24B 7/14* (2013.01); *A47J 42/12* (2013.01); *A47J 42/14* (2013.01); *A47J 42/38* (2013.01); *A47J 42/40* (2013.01); *A47J 42/50* (2013.01)

(58) Field of Classification Search
CPC .. A47J 42/12; A47J 42/38; A47J 42/40; A47J 42/14; A47J 42/20
See application file for complete search history.

(56) References Cited

U.S. PATENT DOCUMENTS

| | | | |
|---|---|---|---|
| 4,304,363 A | 12/1981 | Atkielski | |
| 6,196,481 B1 | 3/2001 | Barbagli | |
| 7,367,519 B2* | 5/2008 | de Groote | A47J 19/04 |
| | | | 241/168 |
| 7,422,170 B2* | 9/2008 | Bao | B02C 18/08 |
| | | | 241/273.3 |

(Continued)

OTHER PUBLICATIONS

International Search Report and Written Opinion for PCT Appl. No. PCT/US2021/065809, dated Mar. 25, 2022, 10 pages.

*Primary Examiner* — Faye Francis
(74) *Attorney, Agent, or Firm* — Patent Law of Virginia PLLC; Brian J. Teague

(57) ABSTRACT

An herb grinder comprises a first enclosure defining a first chamber for holding unground herbs, first and second grinding plates, and a second enclosure defining a second chamber that receives ground herbs. The first grinding plate defines an opening that allows unground herbs to pass from the first chamber. The grinding plates each have a plurality of grinding teeth. The second grinding plate is parallel to and spaced apart from the first grinding plate to define a grinding space therebetween. The second grinding plate defines a plurality of holes. The grinding teeth of each grinding plate are staggered such that, when the first and/or second grinding plates selectively rotate, there is no contact between the grinding teeth. The relative movement of the grinding teeth grinds herbs in the grinding space. The ground herbs pass through the plurality of holes in the second grinding plate into the second chamber.

17 Claims, 9 Drawing Sheets

(56) References Cited

U.S. PATENT DOCUMENTS

| | | | | |
|---|---|---|---|---|
| 8,393,563 | B2 * | 3/2013 | Chaoui | B02C 18/24 |
| | | | | 241/273.3 |
| 8,695,906 | B2 * | 4/2014 | Hainbach | A47J 42/50 |
| | | | | 241/273.3 |
| 8,733,679 | B2 * | 5/2014 | Camitta | B02C 18/24 |
| | | | | 241/89.4 |
| 9,241,597 | B2 * | 1/2016 | Dukat | A47J 42/12 |
| 9,392,908 | B2 | 7/2016 | Edwards et al. | |
| 9,427,020 | B2 * | 8/2016 | Ruzycky | A47J 42/14 |
| 9,510,709 | B2 * | 12/2016 | Wilson | A47J 42/40 |
| 9,737,092 | B2 * | 8/2017 | Grumbacher | A24C 5/40 |
| 2012/0097774 | A1 | 4/2012 | Hainbach | |
| 2017/0135524 | A1 * | 5/2017 | Moneta | B02C 23/10 |
| 2017/0251878 | A1 * | 9/2017 | Dukat | B02C 18/2216 |
| 2018/0168398 | A1 | 6/2018 | Wang | |
| 2020/0022406 | A1 | 1/2020 | Grant | |
| 2020/0187716 | A1 * | 6/2020 | Ashton | A47J 42/14 |
| 2020/0187717 | A1 * | 6/2020 | Pagan | A47J 42/34 |

* cited by examiner

HERB GRINDER AND ASSOCIATED METHOD

CROSS-REFERENCE TO RELATED APPLICATIONS

This application claims priority to pending U.S. Provisional Application Ser. No. 63/136,491, filed Jan. 12, 2021, the contents of which are incorporated herein by reference in its entirety.

FIELD OF THE INVENTION

The present invention relates to herb grinders.

BACKGROUND OF THE DISCLOSURE

A grinder is a mechanical device used for pulverizing herbs, spices, tobacco, and other dried plants into particulates. The herb grinded into the particulates is used in cooking, smoking, or for other purposes.

BRIEF SUMMARY OF THE DISCLOSURE

In one embodiment of the invention, an herb grinder comprises a first enclosure, a first grinding plate, a second grinding plate, and a second enclosure. The first enclosure defines a first chamber for holding unground herbs and has a first end and a second end. The first grinding plate has a first side and an opposing second side. The first grinding plate is positioned such that the first side of the first grinding plate is toward the first chamber and such that the first grinding plate is adapted to allow unground herbs to pass from the first chamber through an opening defined at least partially by the first grinding plate. The first grinding plate has a first plurality of grinding teeth projecting from the second side. The second grinding plate has a first side and an opposing second side and is positioned such that the first side of the second grinding plate is toward the first grinding plate and such that the second grinding plate is parallel to and spaced apart from the first grinding plate to define a grinding space therebetween. The second grinding plate defines a plurality of holes and has a second plurality of grinding teeth projecting from the first side. The second enclosure defines a second chamber positioned such that the second enclosure is adapted to receive ground herbs passing through the plurality of holes in the second grinding plate. The first and second grinding plates are positioned such that at least a portion of the first plurality of grinding teeth project into spaces among the second plurality of grinding teeth and such that at least a portion of the second plurality of grinding teeth project into spaces among the first plurality of grinding teeth. The first grinding plate and/or the second grinding plate are selectively rotatable about a longitudinal axis of the herb grinder. The first plurality of grinding teeth are staggered in relation to the second plurality of grinding teeth and the second plurality of grinding teeth are staggered in relation to the first plurality of grinding teeth such that, when the first grinding plate and/or the second grinding plate selectively rotate about the longitudinal axis of the herb grinder, there is no contact between any of the first plurality of grinding teeth and any of the second plurality of grinding teeth. The relative movement of the first and second pluralities of grinding teeth when the first grinding plate and/or the second grinding plate selectively rotate about the longitudinal axis of the herb grinder is adapted to grind herbs that pass from the first chamber into the grinding space. The plurality of holes in the second grinding plate are adapted to allow ground herbs to pass from the grinding space into the second chamber.

The first end of the first enclosure may be selectively openable to receive unground herbs into the first chamber and selectively closeable to retain unground herbs in the first chamber.

Only one opening may be defined at least partially by the first grinding plate. The opening defined at least partially by the first grinding plate may be sized to allow unground herbs to pass through from the first chamber. The first side of the second grinding plate may have a toothless portion that corresponds (e.g., in size and/or shape) to the opening defined at least partially by the first grinding plate such that one or more unground herbs are able to pass unobstructed through the opening defined at least partially by the first grinding plate into the grinding space when the opening defined at least partially by the first grinding plate and the toothless portion are aligned. A size of the opening defined at least partially by the first grinding plate may be 25-90% of a size of the first grinding plate. At least one edge of the first grinding plate that partially defines the opening in the first grinding plate may be adapted to apply a shearing force to any unground herbs protruding through the opening defined at least partially by the first grinding plate. Two edges of the first grinding plate that partially define the opening defined at least partially by the first grinding plate may be adapted to apply a shearing force to any unground herbs protruding through the opening defined at least partially by the first grinding plate. The two edges of the first grinding plate that partially define the opening defined at least partially by the first grinding plate may meet at an angle. The at least one edge of the first grinding plate that partially defines the opening defined at least partially by the first grinding plate and that is adapted to apply a shearing force to any unground herbs protruding through the opening defined at least partially by the first grinding plate may be serrated.

The second enclosure may define a dispensing opening that is selectively openable to dispense ground herbs from the second chamber and selectively closeable to retain ground herbs in the second chamber.

The first grinding plate may be positioned at the second end of the first enclosure. The first grinding plate may be integral with second enclosure. The second grinding plate may be positioned within the second enclosure. The second grinding plate may be selectively removable from the second enclosure.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1:
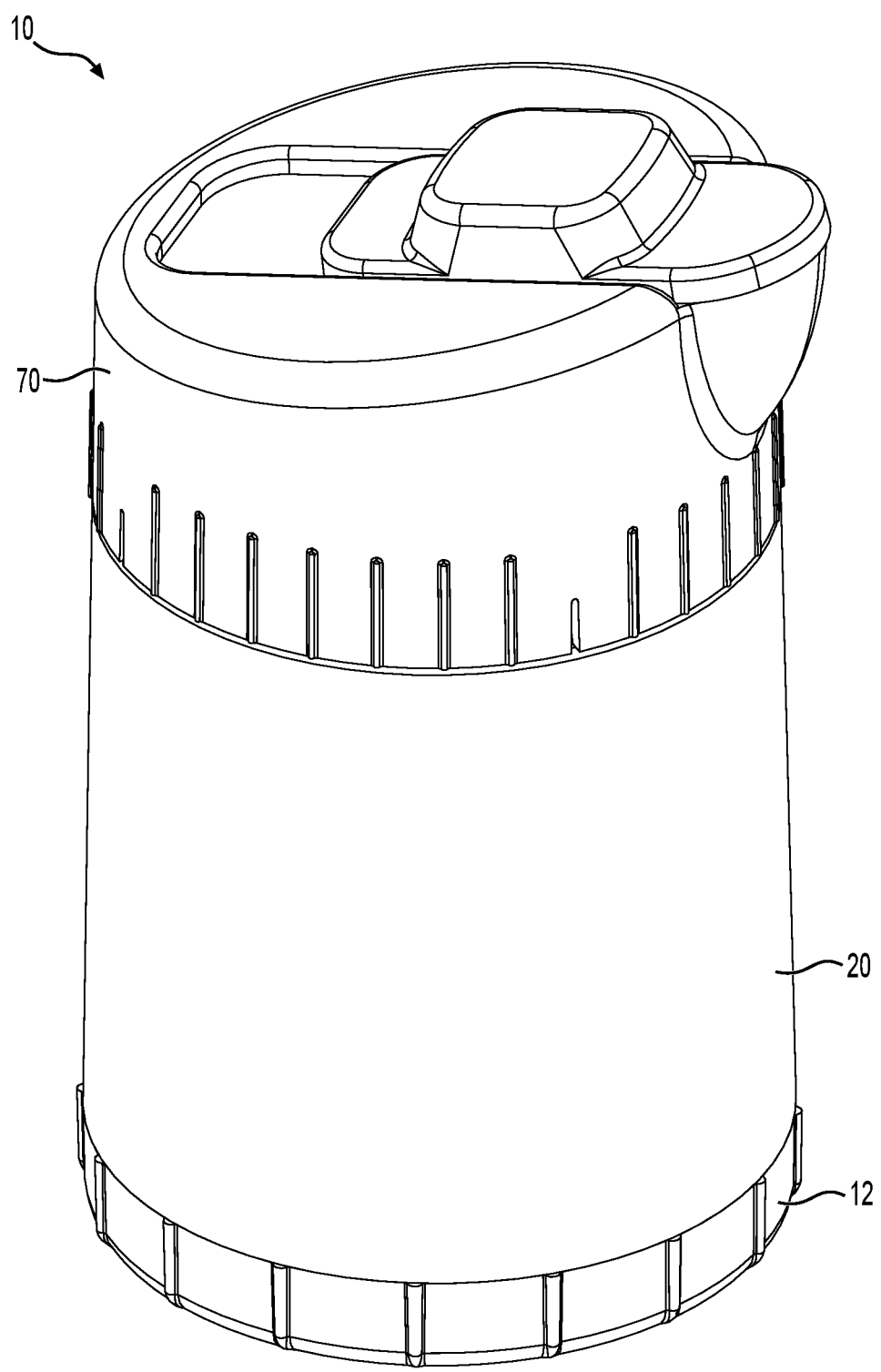
FIG. 1 is a perspective view of an herb grinder, in accordance with embodiments of the invention.

Certain terminology is used in the following description for convenience only and is not limiting. The words "lower," "bottom," "upper," "top," "left" and "right" and the like designate directions in the drawings to which reference is made. The words "inwardly," "outwardly," "upwardly" and "downwardly" and the like refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Figure 2:
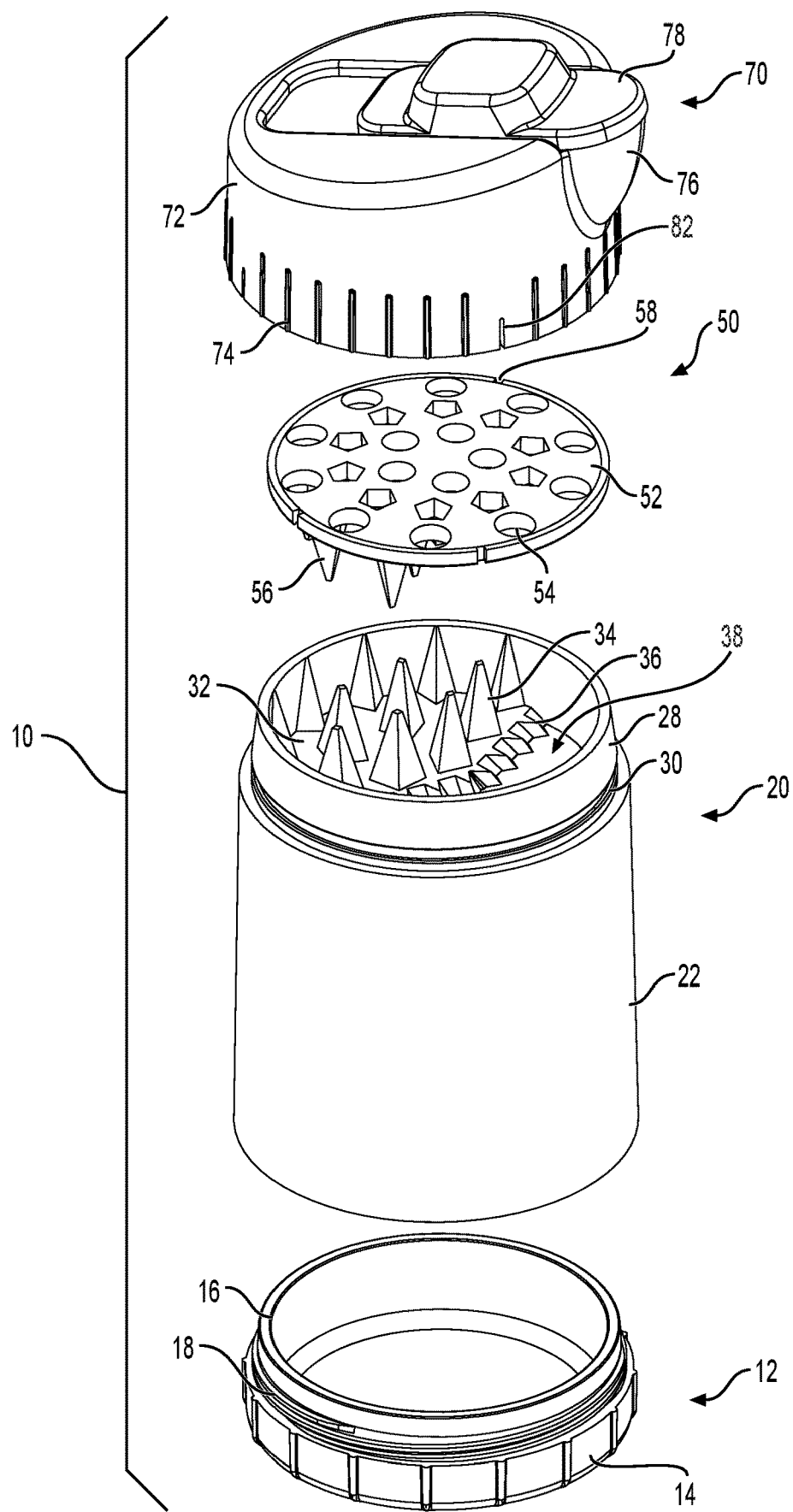
FIG. 2 is an exploded perspective view, from the top, of the herb grinder of FIG. 1.
Figure 3:
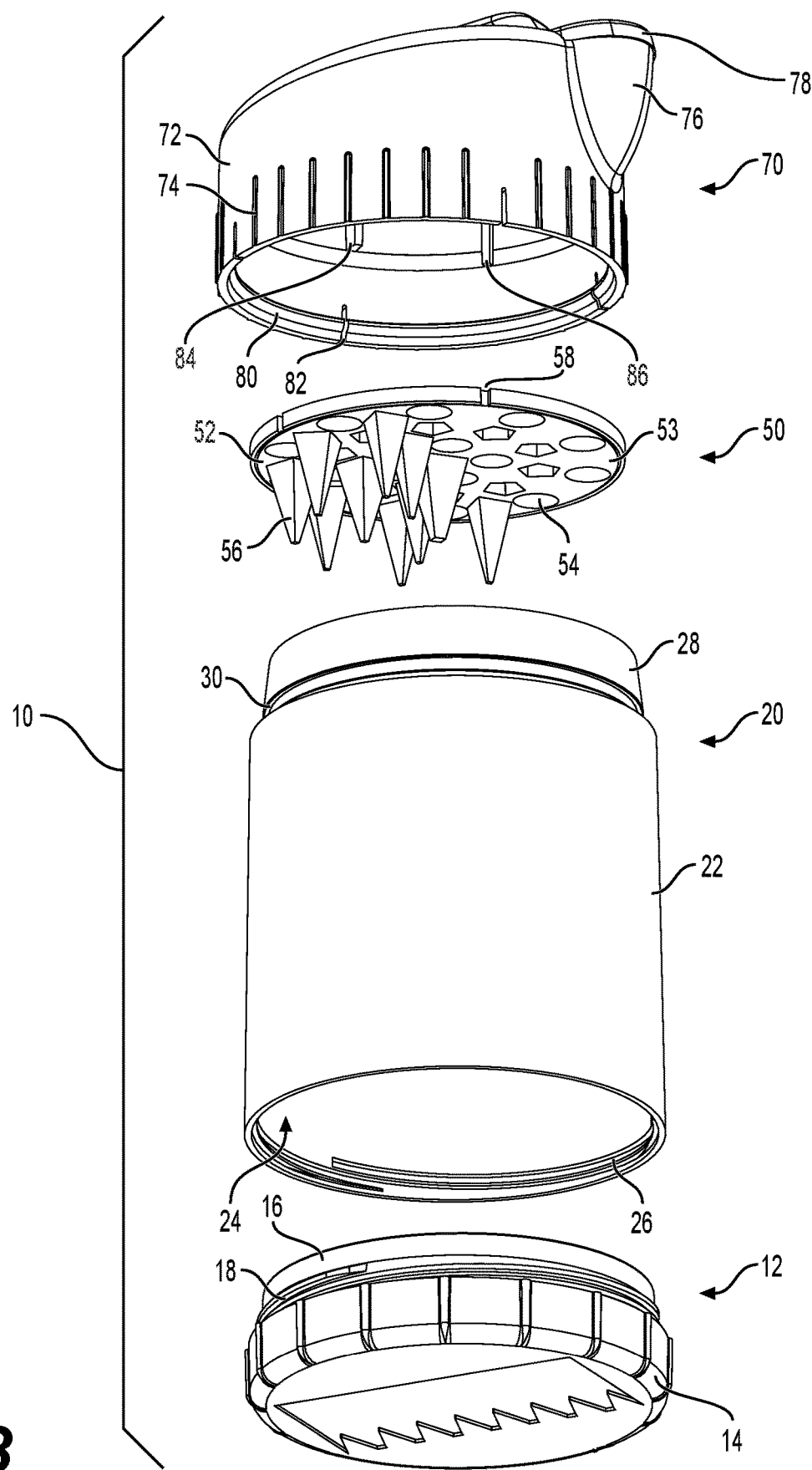
FIG. 3 is an exploded perspective view, from the bottom, of the herb grinder of FIG. 1.
Figure 11:
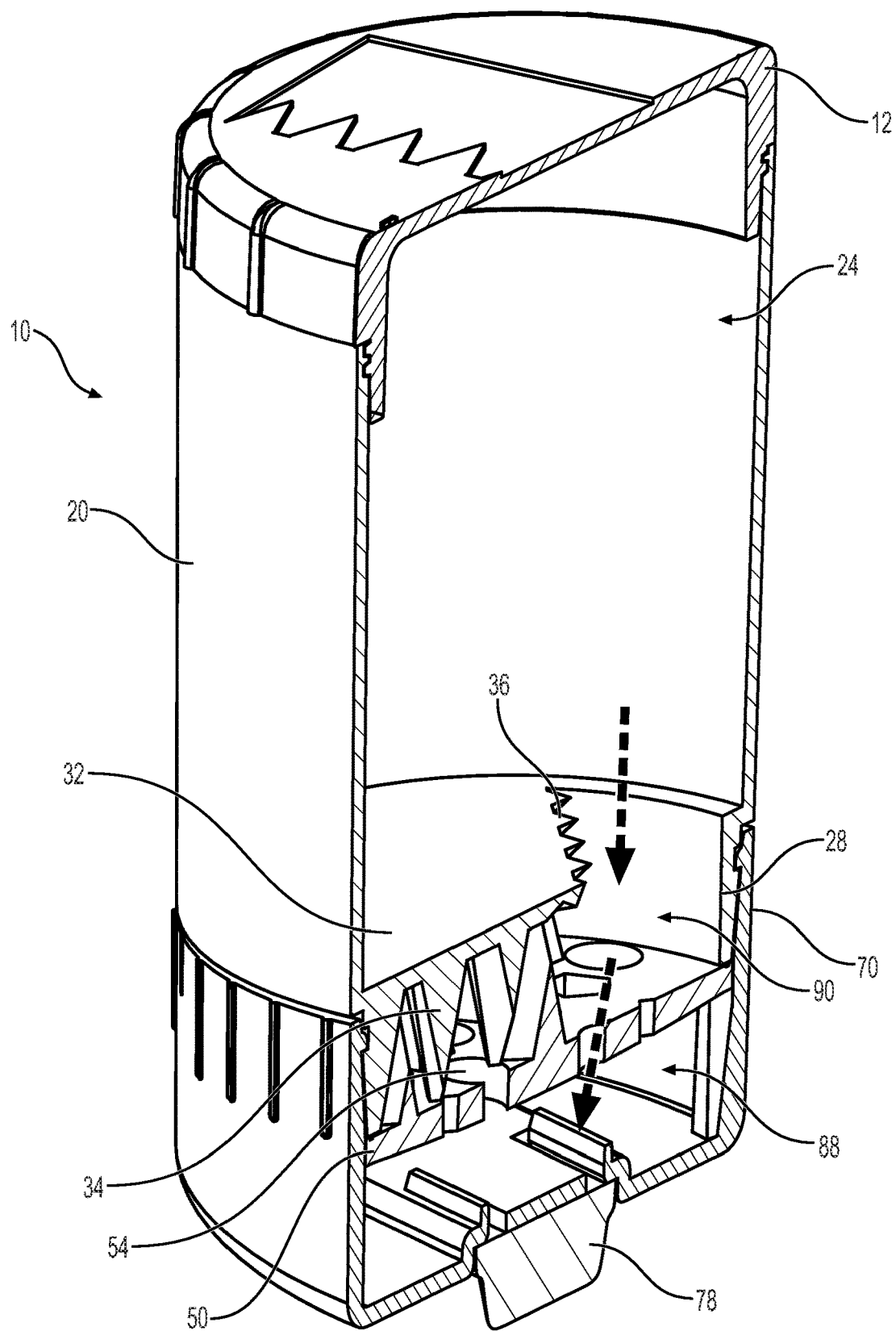
FIG. 11 is a sectional view of the herb grinder of FIG. 1.
Figure 12:
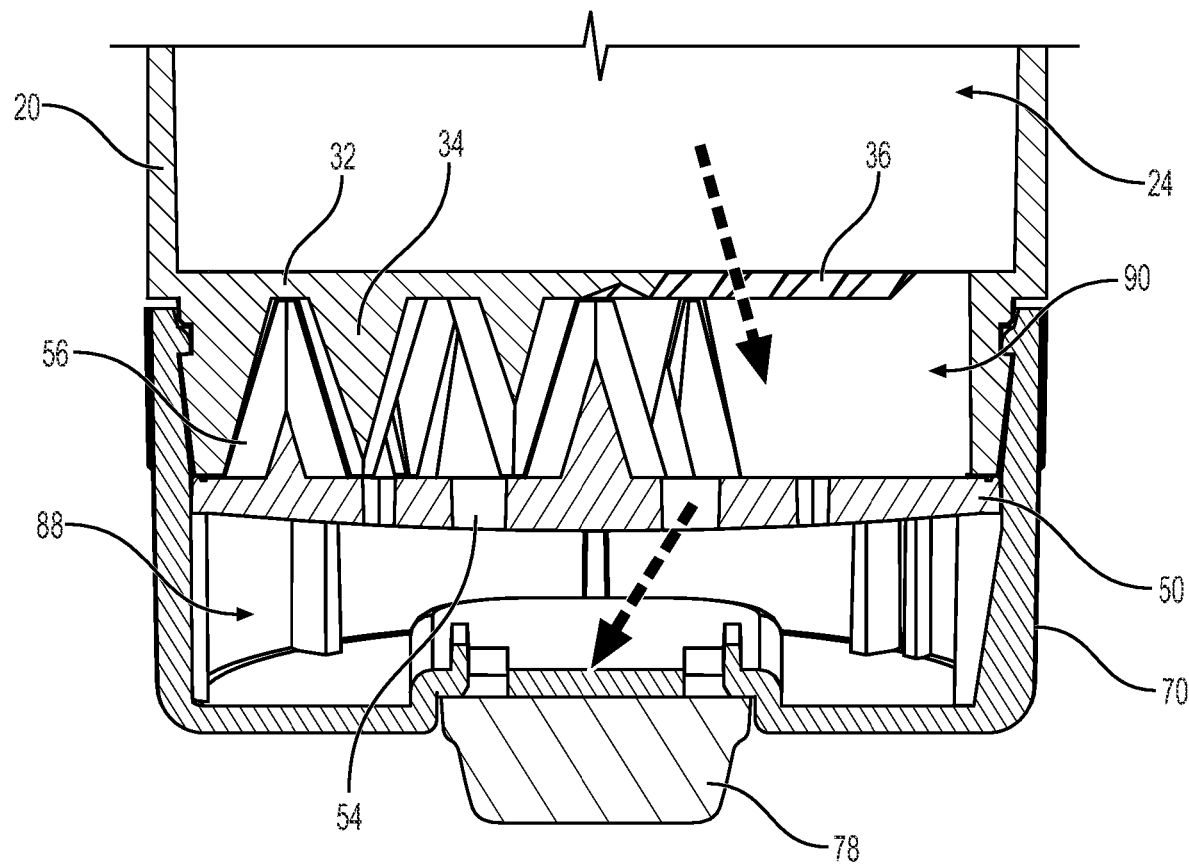
FIG. 12 is a sectional view of a portion of the herb grinder of FIG. 1.

Embodiments of the invention are directed to a device and method for grinding dried plant material, such as herbs, tobacco, hemp, and the like. The device is typically stored in one orientation (as shown in FIGS. 1-3) when not in use and in a flipped orientation (as shown in FIGS. 11 and 12) when in use. The structure of the device and components thereof will be described herein as in the orientation shown in FIGS. 1-3, thus for purposes of this disclosure the lid 12 of the hopper 20 is the bottommost component of the device and the ground herb receiving portion 70 is the topmost component of the device. The use of the device will be described herein with reference to the orientation shown in FIGS. 11 and 12.

The herb grinder of embodiments of the invention may be used to store dried plant material, such as plant bulbs or nuggets, and to grind one or more of the stored nuggets into smaller pieces for smoking. The nuggets are also referred to herein as unground herb(s). Referring now to the figures, the herb grinder 10 comprises several modular components that are easily disassembled for cleaning (shown in FIGS. 2 and 3) and reassembled for use (shown in FIG. 1). The herb grinder 10 comprises a hopper or storage compartment 20, a lid 12 for the hopper 20, a removable grinding plate 50, and a ground herb receiving portion 70. All of the components are constructed of any suitable rigid and durable material, including any suitable plastic or combination of plastics or any suitable metal or combination of metals.

Figure 4:
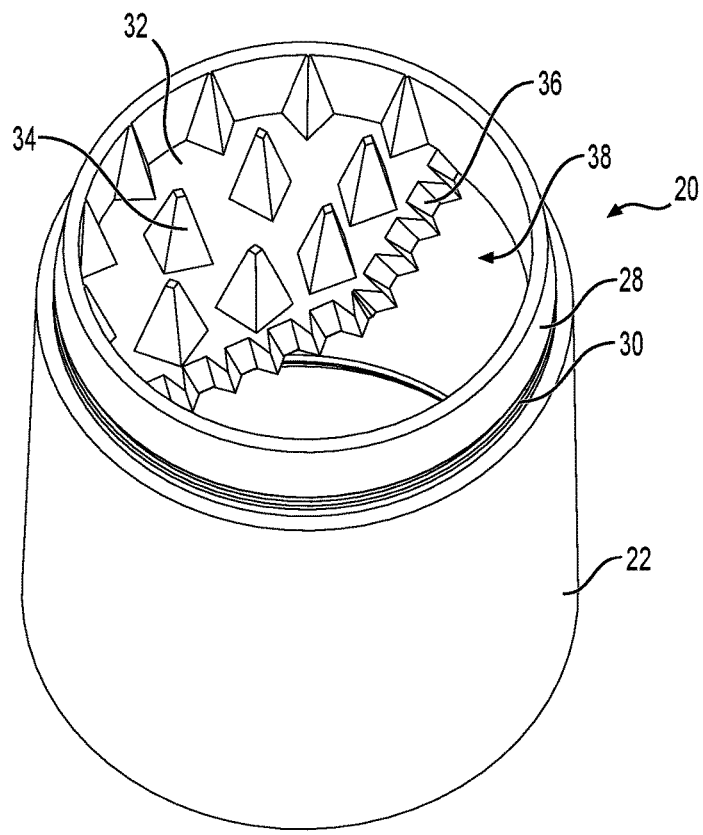
FIGS. 4 and 5 are, respectively, top and bottom perspective views of a hopper portion and fixed grinding plate of the herb grinder of FIG. 1.
Figure 5:
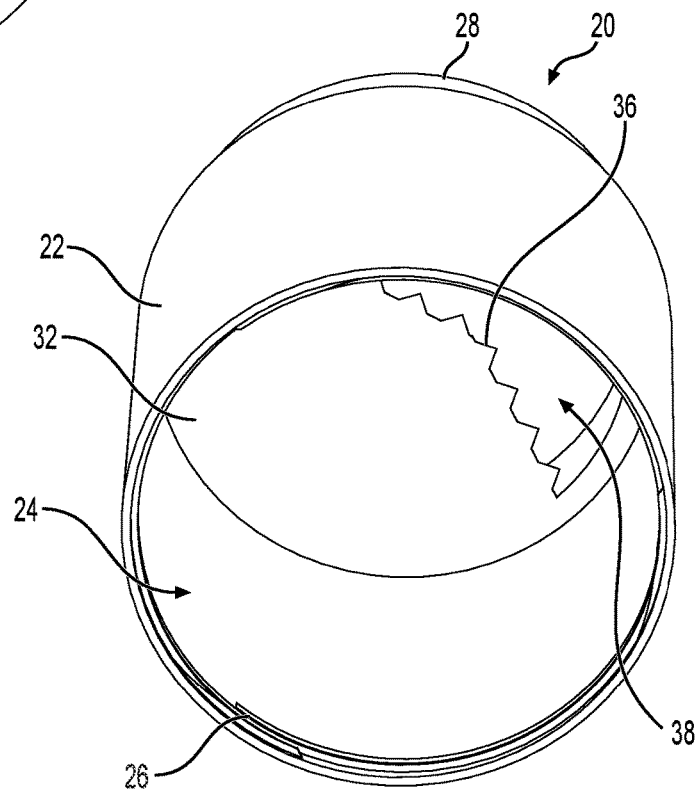

As seen in FIGS. 4 and 5, the hopper 20 comprises a generally cylindrical main body 22. The bottom end of the hopper 20 is open and has female threads 26 to selectively attach the lid 12, thereby forming a storage chamber 24 into which unground nuggets may be placed for storage and future grinding. The lid 12 comprises a grasping portion 14 with protrusions to aid a user in grasping and rotating the lid 12 and a reduced diameter collar 16 with male threads 18 that engage the female threads of the hopper 20. The hopper 20 may have any suitable size, depending on the desired storage capacity, usability, portability, and other factors.

Near the top end of the hopper 20, there is a planar shelf 32 that spans some, but not all, of the interior of the top end of the hopper 20. The shelf 32 functions as and may be termed a bottom grinding plate. The shelf 32 is integral with and therefore fixed in relation to the body 22 of the hopper 20. Importantly, an opening 38 is defined by the shelf 32 and the wall of the hopper body 22 to allow nuggets that are to be ground to fall from the storage chamber 24 into the grinding space (described further below). (Alternatively, the opening could be formed entirely within the shelf itself.) The size and shape of the opening 38 may vary, but the opening 38 should be sized and shaped to allow a variety of different sized nuggets to pass through (partially or wholly) the opening 38. While only one opening is illustrated, alternative embodiments of the invention may have more than one opening from the storage chamber into the grinding space. A plurality of bottom grinding teeth 34 project upward from the shelf 32. The number, size, shape, and position of the bottom grinding teeth 34 may vary. In the illustrated embodiment, the bottom grinding teeth 34 are generally pyramidal and there are six freestanding teeth and six teeth that are integral with the wall of the hopper body 22. The bottom grinding teeth 34 should be positioned and spaced to enable the top grinding teeth 56 of the removable grinding plate 50 (described further below) to pass closely between/among the bottom grinding teeth 34 during the grinding process (described further below). The height of the bottom grinding teeth 34 and the top grinding teeth 56 is typically dictated by the desired height of the grinding chamber (i.e., the space between the floor of the shelf 32 and the floor 52 of the removable grinding plate 50 (described further below) when the herb grinder 10 is assembled).

The shelf 32 has an edge 36 that provides a shearing force to any nuggets protruding through the opening 38 during the grinding process (which may occur, e.g., if a nugget is too big to fit entirely into the grinding chamber). The edge is sharply angled (i.e., the leading edge of the top surface of the shelf 32 is set back from the leading edge of the bottom surface of the shelf 32) (about 45 degrees in the illustrated embodiment) and serrated. In the illustrated embodiment, the edge 36 comprises two generally linear portions (disregarding the serrations) that are angled relative to each other.

As discussed above, the size and shape of the opening 38 may vary, but the opening 38 should be sized and shaped to allow a variety of different sized nuggets to pass through (partially or wholly) the opening 38. The opening 38 may be about 50%-100% the size of the shelf 32.

The top end of the hopper 20 has a reduced diameter collar 28 with a circumferential channel 30 for selectively joining the ground herb receiving portion 70 and the hopper 20 (described further below).

Figure 6:
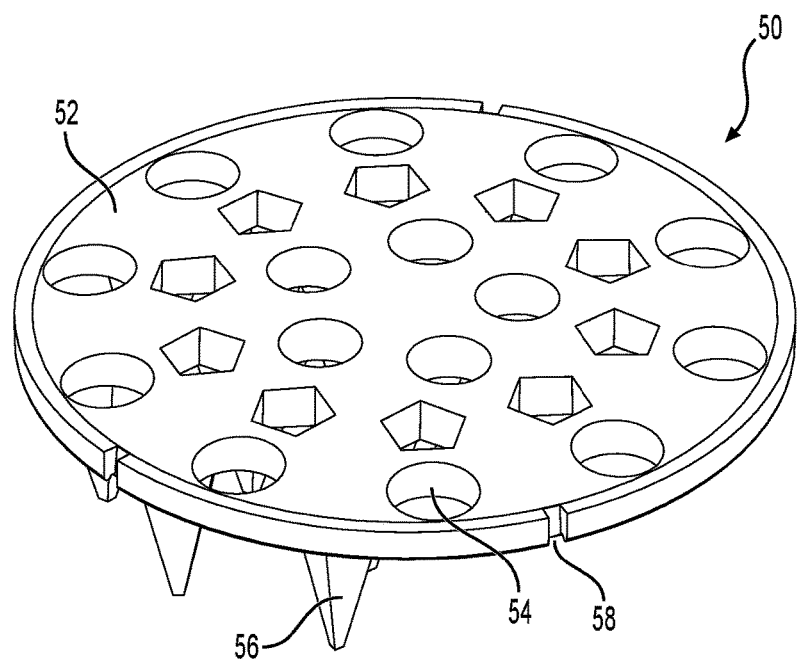
FIGS. 6 and 7 are perspective views of a removable grinding plate of the herb grinder of FIG. 1.
Figure 7:
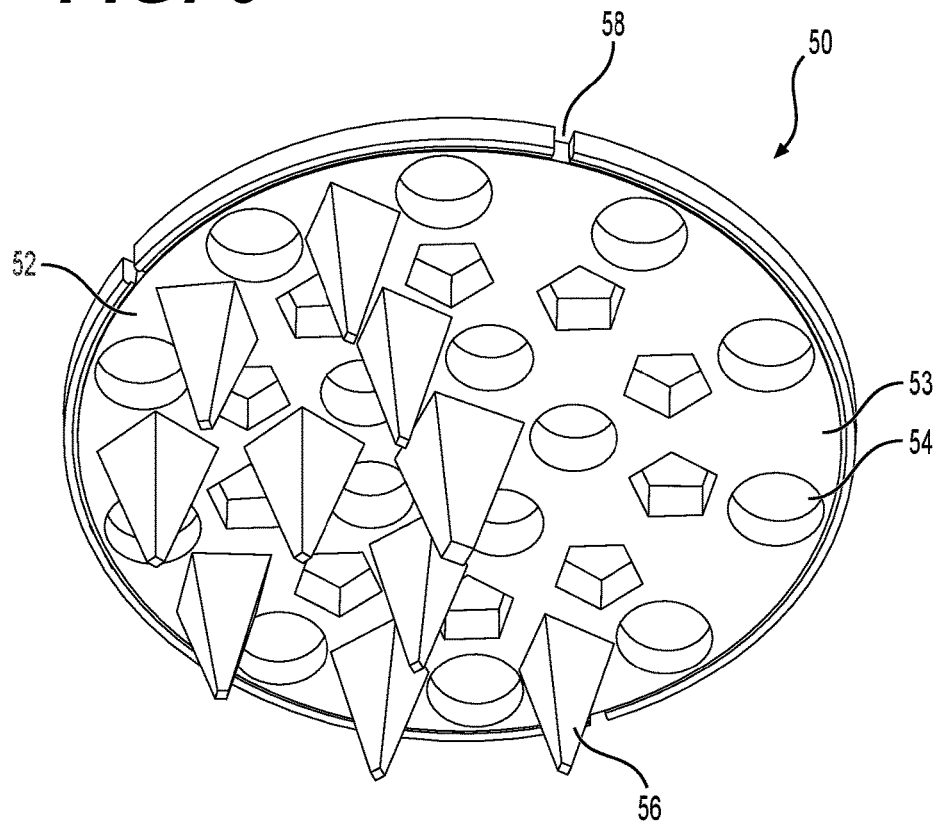

As seen in FIGS. 6 and 7, the removable grinding plate 50 comprises a circular floor 52. A plurality of top grinding teeth 56 project downward from the floor 52. The number, size, shape, and position of the top grinding teeth 56 may vary. In the illustrated embodiment, the top grinding teeth 56 are generally pyramidal and there are ten freestanding teeth. The top grinding teeth 56 should be positioned and spaced to enable the bottom grinding teeth 34 to pass closely between/among the top grinding teeth 56 during the grinding process (described further below). The height of the bottom grinding teeth 34 and the top grinding teeth 56 is typically dictated by the desired height of the grinding chamber (i.e., the space between the shelf 32 of the fixed grinding plate and the floor 52 of the removable grinding plate 50 when the herb grinder 10 is assembled). That is, the distal ends of the bottom grinding teeth 34 should come close to but not contact the floor 52 of the removable grinding plate 50 and the distal ends of the top grinding teeth 56 should come close to but not contact the shelf 32 of the fixed grinding plate when the herb grinder 10 is assembled. Importantly, there is a portion 53 of the floor 52 that does not have any teeth. This toothless portion 53 corresponds generally in size and shape with the opening 38 defined by the shelf 32. When the toothless portion 53 and the opening 38 are aligned, an entry space 90 is defined to allow one or more nuggets to pass from the hopper 20 into the grinding chamber (i.e., the space between the two grinding plates).

A plurality of holes 54 are defined in the floor 52 of the removable grinding plate 50 to allow the ground pieces of the nugget to pass from the grinding chamber into the receiving chamber 88 defined in the ground herb receiving portion 70 (described below). Any suitable number, size, shape, and position of holes may be used, all of these factors contributing to the size of the pieces that are allowed to pass from the grinding chamber into the receiving chamber 88. In the illustrated embodiment, there is an outer ring of ten circular holes, a middle ring of ten pentagonal holes, and an inner ring of five circular holes. Different removable grinding plates with different sized holes may be provided, such that a user may install a specific removable grinding plate with holes sizes that will provide the desired grind size.

Figure 8:
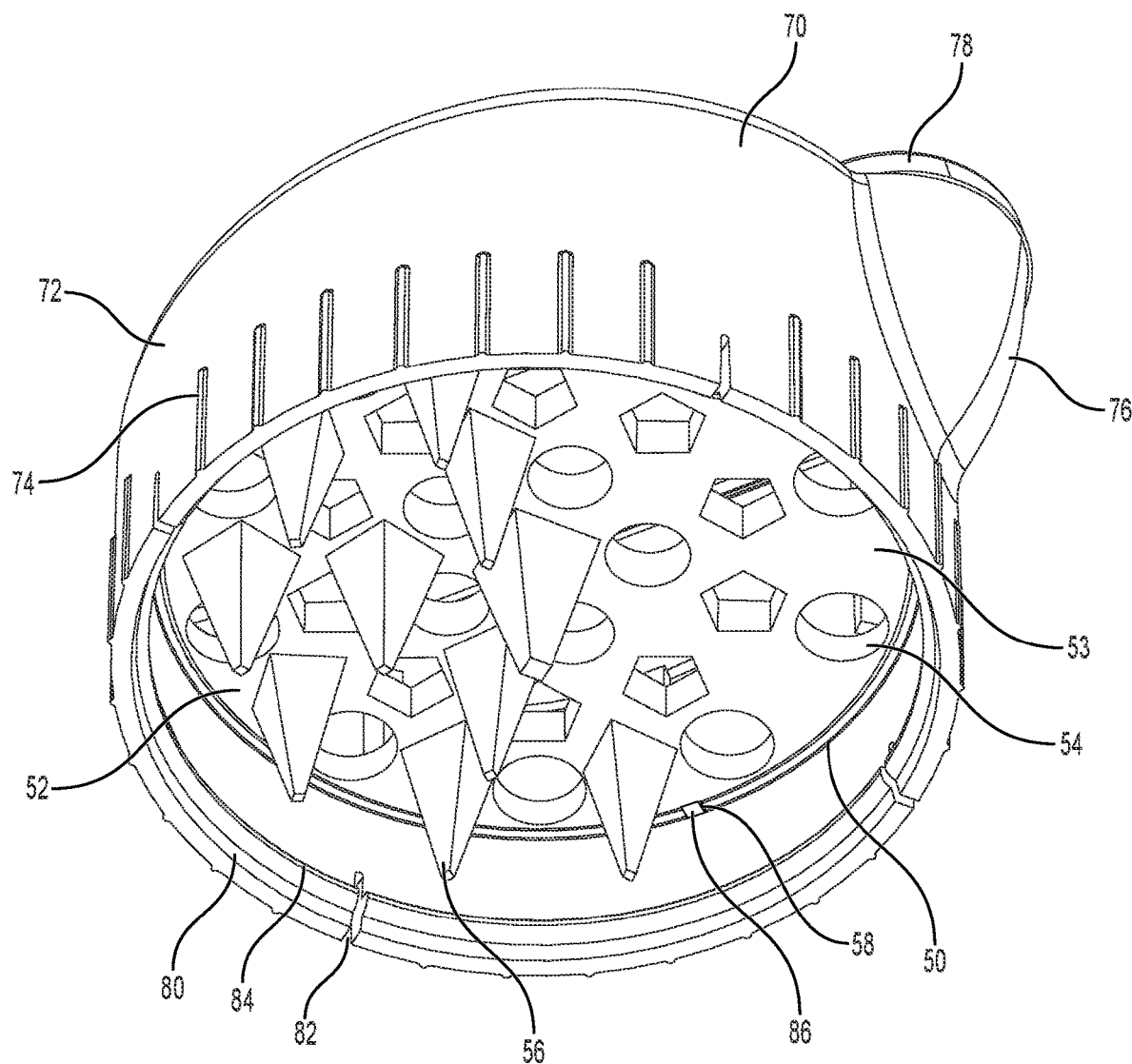
FIG. 8 is a bottom perspective view of a ground herb receiving portion of the herb grinder of FIG. 1.
Figure 9:
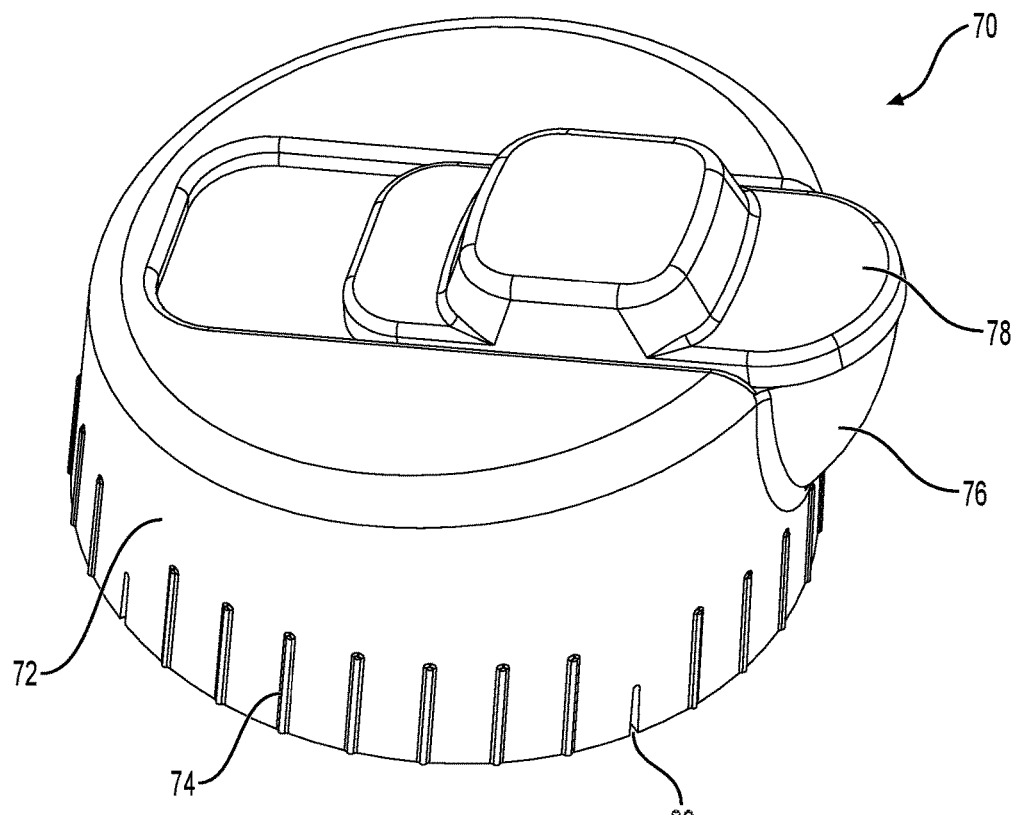
FIGS. 9 and 10 are top and bottom perspective views of the ground herb receiving portion of the herb grinder of FIG. 1, in, respectively, closed and open arrangements.
Figure 10:
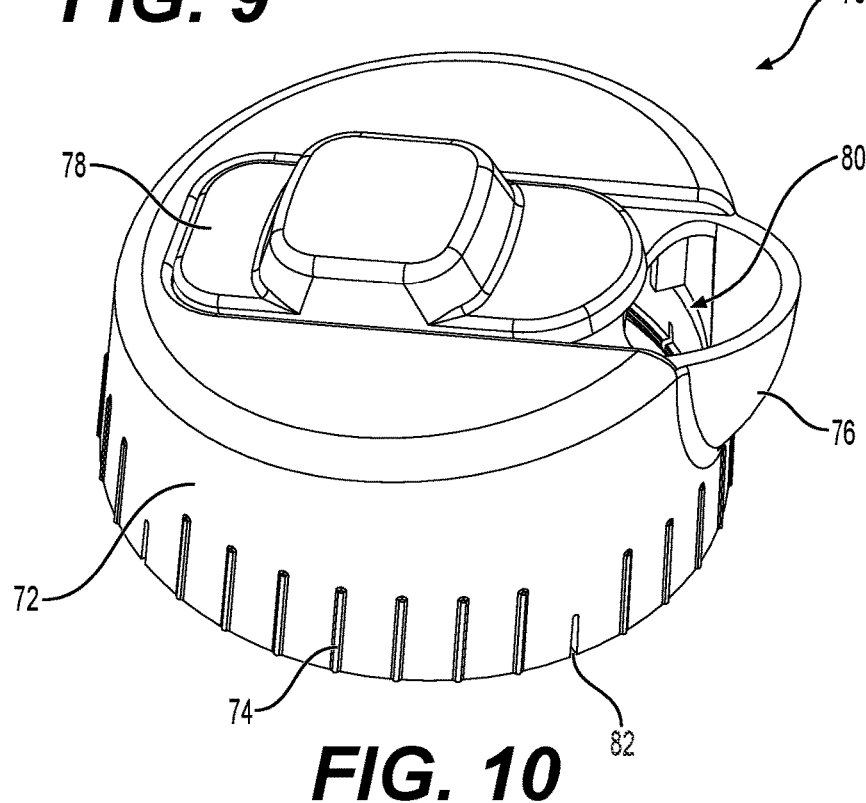

A plurality of gaps 58 (three are shown) are spaced about the perimeter of the removable grinding plate 50. These gaps 58 each engage a corresponding one of a plurality of vertical ridges 86 spaced about the interior of the ground herb receiving portion 70 to ensure that the removable grinding plate 50 stays fixed in relation to the ground herb receiving portion 70 during the grinding process. This engagement is seen in FIG. 8.

The ground herb receiving portion 70 is selectively affixable to and selectively rotatable in relation to the hopper 20. (Typically, a user would grasp the ground herb receiving portion 70 and rotate the hopper 20; however, a user could also grasp the hopper 20 and rotate the ground herb receiving portion 70. The hopper and the ground herb receiving portion are each rotatable in relation to the other.) The ground herb receiving portion 70 caps the open top end of the hopper 20, receives and holds in position the removable grinding plate 50, defines a receiving chamber 88 to receive the ground herbs, and dispenses the ground herbs via a dispensing hole 80 defined by a spout 76. The spout 76 enables a user to dispense the ground herbs to a preferred location (e.g., into a smoking device) without having to touch the ground herbs. The ground herb receiving portion 70 comprises a main body 72 having an open bottom end defined by a bottom rim 80 and a closed top end (but with a dispensing hole 80 that is selectively openable and closeable via a sliding closure 78 (or any other suitable dispensing/closing mechanism)). A plurality of raised ridges 74 (or other similar grasping aids) are spaced about the main body 72 of the ground herb receiving portion 70 to more easily enable a user to grasp and turn the ground herb receiving portion 70 during the grinding process.

The ground herb receiving portion 70 snaps onto the top end of the hopper 20. A circumferential shoulder 84 inside the bottom end of the ground herb receiving portion 70 engages the channel 30 at the top end of the hopper 20 to retain the ground herb receiving portion 70 onto the hopper 20. A plurality of relief cuts 82 provide the flexibility to enable the bottom rim 80 of the ground herb receiving portion 70 to flex outward as the shoulder 84 contacts the collar 28 of the hopper 20 as the ground herb receiving portion 70 is attached to the hopper 20.

When the removable grinding plate 50 is inserted into the ground herb receiving portion 70, a plurality (typically at least three) of spaced-apart vertical ridges 84 (or any other suitable structure) on the inside surface of the ground herb receiving portion 70 stop the removable grinding plate 50 at the desired position for operation. When the removable grinding plate 50 is in position in the ground herb receiving portion 70, a receiving chamber 88 is defined in the upper portion of the ground herb receiving portion 70 to receive ground herbs that pass through the holes 54 defined in the removable grinding plate 50.

While the herb grinder of embodiments of the invention is described herein as having a fixed grinding plate and a removable grinding plate, alternative embodiments may have two fixed grinding plates or two removable grinding plates.

The use of the herb grinder 10 will be described with reference to FIGS. 1, 11, and 12. If the herb grinder 10 is assembled as shown in FIG. 1 but does not contain any unground nuggets in the hopper 20, a user unscrews the lid 12 to provide access to the storage chamber 24. The user may than insert any desired number of nuggets into the storage chamber 24 of the hopper 20 and screw the lid 12 back onto the hopper 20. The user may store the unground nuggets in hopper 20 of the herb grinder 10 until the user desires to grind some or all of the nuggets in the hopper 20.

When the user desires to grind some or all of the nuggets in the hopper 20, the user inverts the herb grinder 10 into the position shown in FIGS. 11 and 12. This will cause one or more nuggets to pass through the opening 38 (illustrated by the top dashed line arrow in FIGS. 11 and 12) into the entry space 90, if the opening 38 and the toothless portion 53 are (completely or partially) aligned. If the opening 38 and the toothless portion 53 are not aligned, then the position of some of the teeth 56 of the removable grinding plate 50 will block nuggets from passing into the entry space 90. To remedy this, the user will have to grasp the hopper 20 in one hand and the ground herb receiving portion 70 in the other hand and rotate either the hopper 20 relative to the ground herb receiving portion 70 and/or rotate the ground herb receiving portion 70 relative to the hopper 20 (this process will be subsequently referred to herein as "rotating the herb grinder 10") until the opening 38 and the toothless portion 53 are aligned and one or more nuggets drop into the entry space 90. The grinder is gravity-fed such that (in a preferred embodiment) the only force driving the nuggets into the shearing mechanism is gravity. The user will know when one or more nuggets drop into the entry space 90 as the user will feel more resistance as the user rotates the herb grinder 10. As the user continues to rotate the herb grinder 10, the nugget(s) in the entry space 90 will be dragged by the rotating teeth (either teeth 34 or teeth 56) into the nugget grinding area (the area between the two grinding plates where the teeth mesh) where the meshing of the teeth 34, 56 will grind the nugget(s) into smaller pieces. The ground pieces will fall through the holes 54 of the floor 52 (illustrated by the bottom dashed line arrow in FIGS. 11 and 12) and into the receiving chamber 88 of the ground herb receiving portion 70. If the sliding closure 78 is open, the ground pieces will drop out of the ground herb receiving portion 70 through the opening 80 onto the surface below or directly into the smoking device, with no touching needing by the user. If the sliding closure 78 is closed, the ground pieces will collect in the receiving chamber 88 until the sliding closure 78 is opened.

If a nugget does not fit entirely in the entry space 90, the rotating teeth will drag the nugget against the edge 36 of the shelf 32 which will shear the nugget and allow the now-smaller portion to be dragged into the nugget grinding area.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below (if any) are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. An herb grinder comprising:
    a first enclosure defining a first chamber for holding unground herbs, the first enclosure having a first end and a second end;
    a first grinding plate having a first side and only one opposing second side, the first grinding plate positioned such that the first side of the first grinding plate is toward the first chamber and such that the first grinding plate is adapted to allow unground herbs to pass from the first chamber through an opening defined at least partially by the first grinding plate, the first grinding plate having a first plurality of grinding teeth projecting from the second side;
    a second grinding plate having a first side and an opposing second side, the second grinding plate positioned such that the first side of the second grinding plate is toward the first grinding plate and such that the second grinding plate is parallel to and spaced apart from the first grinding plate to define a grinding space therebetween, the second grinding plate defining a plurality of holes, the second grinding plate having a second plurality of grinding teeth projecting from the first side; and
    a second enclosure defining a second chamber positioned such that the second enclosure is adapted to receive ground herbs passing through the plurality of holes in the second grinding plate;
    wherein the first and second grinding plates are positioned such that at least a portion of the first plurality of grinding teeth project into spaces among the second plurality of grinding teeth and such that at least a portion of the second plurality of grinding teeth project into spaces among the first plurality of grinding teeth;
    wherein the first grinding plate and/or the second grinding plate are selectively rotatable about a longitudinal axis of the herb grinder;
    wherein the first plurality of grinding teeth are staggered in relation to the second plurality of grinding teeth and the second plurality of grinding teeth are staggered in relation to the first plurality of grinding teeth such that, when the first grinding plate and/or the second grinding plate selectively rotate about the longitudinal axis of the herb grinder, there is no contact between any of the first plurality of grinding teeth and any of the second plurality of grinding teeth;
    wherein the relative movement of the first and second pluralities of grinding teeth when the first grinding plate and/or the second grinding plate selectively rotate about the longitudinal axis of the herb grinder is adapted to grind herbs that pass from the first chamber into the grinding space; and
    wherein the plurality of holes in the second grinding plate are adapted to allow ground herbs to pass from the grinding space into the second chamber.

2. The herb grinder of claim 1, wherein the first end of the first enclosure is selectively openable to receive unground herbs into the first chamber and selectively closeable to retain unground herbs in the first chamber.

3. The herb grinder of claim 1, wherein the opening defined at least partially by the first grinding plate is sized to allow unground herbs to pass through from the first chamber.

4. The herb grinder of claim 1, wherein the first side of the second grinding plate has a toothless portion that corresponds to the opening defined at least partially by the first grinding plate such that one or more unground herbs are able to pass unobstructed through the opening defined at least partially by the first grinding plate into the grinding space when the opening defined at least partially by the first grinding plate and the toothless portion are aligned.

5. The herb grinder of claim 1, wherein a size of the opening defined at least partially by the first grinding plate is 25-90% of a size of the first grinding plate.

6. The herb grinder of claim 1, wherein at least one edge of the first grinding plate that partially defines the opening is adapted to apply a shearing force to any unground herbs protruding through the opening defined at least partially by the first grinding plate.

7. The herb grinder of claim 6, wherein two edges of the first grinding plate that partially define the opening are adapted to apply a shearing force to any unground herbs protruding through the opening defined at least partially by the first grinding plate.

8. The herb grinder of claim 6, wherein the two edges of the first grinding plate that partially define the opening meet at an angle.

9. The herb grinder of claim 6, wherein the at least one edge of the first grinding plate that partially defines the opening and that is adapted to apply a shearing force to any unground herbs protruding through the opening is serrated.

10. The herb grinder of claim 1, wherein the second enclosure defines a dispensing opening that is selectively openable to dispense ground herbs from the second chamber and selectively closeable to retain ground herbs in the second chamber.

11. The herb grinder of claim 10, wherein the second enclosure comprises a pour spout adjacent to the dispensing opening to enable the dispensed ground herbs to be directed to a preferred location touchlessly.

12. The herb grinder of claim 1, wherein the first grinding plate is positioned at the second end of the first enclosure.

13. The herb grinder of claim 12, wherein the first grinding plate is integral with second enclosure.

14. The herb grinder of claim 12, wherein the second grinding plate is positioned within the second enclosure.

15. The herb grinder of claim 14, wherein the second grinding plate is selectively removable from the second enclosure.

16. The herb grinder of claim 1, wherein unground herbs pass from the first chamber through the opening defined at least partially by the first grinding plate by gravity alone.

17. An herb grinder comprising:
- a first enclosure defining a first chamber for holding unground herbs, the first enclosure having a first end and a second end;
- a first grinding plate having a first side and an opposing second side, the first grinding plate positioned such that the first side of the first grinding plate is toward the first chamber and such that the first grinding plate is adapted to allow unground herbs to pass from the first chamber through only one opening defined at least partially by the first grinding plate, the first grinding plate having a first plurality of grinding teeth projecting from the second side;
- a second grinding plate having a first side and an opposing second side, the second grinding plate positioned such that the first side of the second grinding plate is toward the first grinding plate and such that the second grinding plate is parallel to and spaced apart from the first grinding plate to define a grinding space therebetween, the second grinding plate defining a plurality of holes, the second grinding plate having a second plurality of grinding teeth projecting from the first side; the first side of the second grinding plate having a toothless portion that corresponds to the opening defined at least partially by the first grinding plate such that one or more unground herbs are able to pass unobstructed through the opening defined at least partially by the first grinding plate into the grinding space when the opening defined at least partially by the first grinding plate and the toothless portion are aligned; and
- a second enclosure defining a second chamber positioned such that the second enclosure is adapted to receive ground herbs passing through the plurality of holes in the second grinding plate;
- wherein the first and second grinding plates are positioned such that at least a portion of the first plurality of grinding teeth project into spaces among the second plurality of grinding teeth and such that at least a portion of the second plurality of grinding teeth project into spaces among the first plurality of grinding teeth;
- wherein the first grinding plate and/or the second grinding plate are selectively rotatable about a longitudinal axis of the herb grinder;
- wherein the first plurality of grinding teeth are staggered in relation to the second plurality of grinding teeth and the second plurality of grinding teeth are staggered in relation to the first plurality of grinding teeth such that, when the first grinding plate and/or the second grinding plate selectively rotate about the longitudinal axis of the herb grinder, there is no contact between any of the first plurality of grinding teeth and any of the second plurality of grinding teeth;
- wherein the relative movement of the first and second pluralities of grinding teeth when the first grinding plate and/or the second grinding plate selectively rotate about the longitudinal axis of the herb grinder is adapted to grind herbs that pass from the first chamber into the grinding space; and
- wherein the plurality of holes in the second grinding plate are adapted to allow ground herbs to pass from the grinding space into the second chamber.

* * * * *